W. A. MILLER.
PIPE DIE.
APPLICATION FILED MAR. 10, 1917.

1,319,602.

Patented Oct. 21, 1919.
2 SHEETS—SHEET 1.

WITNESSES
Thos. B. Roscow.
Elizabeth Guy

INVENTOR
W. A. Miller.
BY Victor J. Evans
ATTORNEY

W. A. MILLER.
PIPE DIE.
APPLICATION FILED MAR. 10, 1917.
1,319,602.
Patented Oct. 21, 1919.
2 SHEETS—SHEET 2.
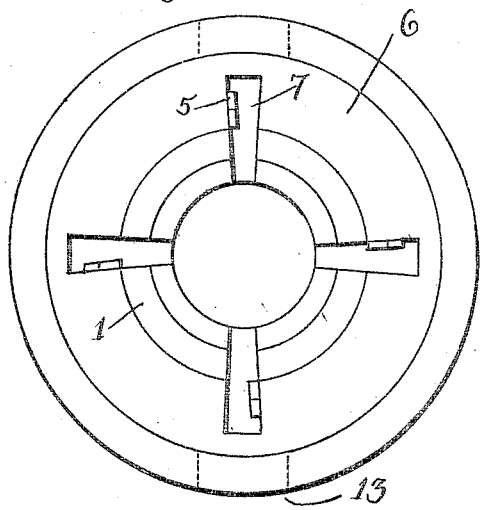
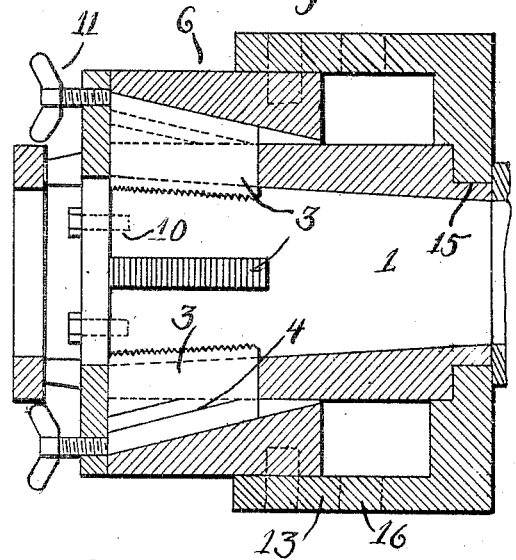
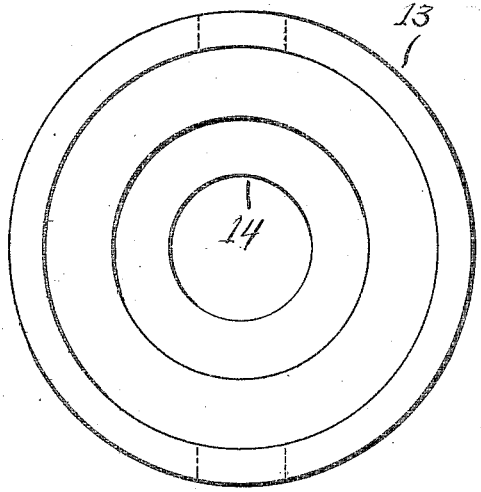
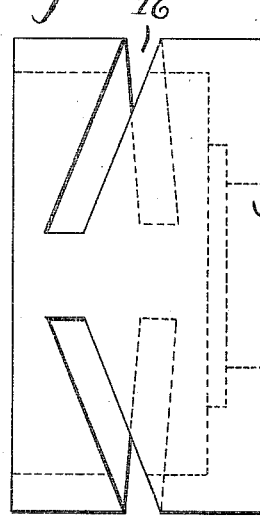
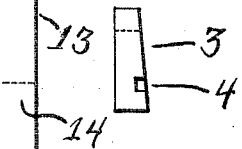
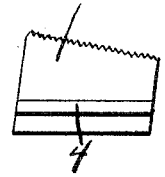
WITNESSES
Thos. B. Roscow.
Elizabeth Essay
INVENTOR
W. A. Miller.
BY Victor J. Evans
ATTORNEY

UNITED STATES PATENT OFFICE.

WILLIAM A. MILLER, OF WEST ETNA, PENNSYLVANIA.

PIPE-DIE.

1,319,602.  Specification of Letters Patent.  Patented Oct. 21, 1919.

Application filed March 10, 1917. Serial No. 153,902.

*To all whom it may concern:*

Be it known that I, WILLIAM A. MILLER, a citizen of the United States, residing at West Etna, in the county of Allegheny and State of Pennsylvania, have invented new and useful Improvements in Pipe-Dies, of which the following is a specification.

This invention relates to a pipe die and has for its primary object to provide a die of substantial construction and capable of a quick connection and disconnection with a pipe.

An object of the invention is the novel manner of constructing certain parts so that an accurate adjustment of the cutters can be accomplished and positively fixed against movement during the cutting operation.

Another object of the invention is the use of an element whereby the foregoing action may be destroyed and the cutters instantly collapsed for obvious reasons.

Besides the above my invention is distinguished in the manner of forming each element solid thus making the device of more substantial construction and a reduction in cost.

With these and other objects in view the invention will be better understood from the following detail description taken in connection with the accompanying drawings wherein:—

Fig. 7 is a front elevation of the center showing the collar associated therewith.

Fig. 8 is an end elevation of the collar.

Fig. 9 is a sectional view.

Figs. 10 and 11 are detail views of a cutter.

Fig. 12 is a longitudinal sectional view of the complete die.

Figure 1:
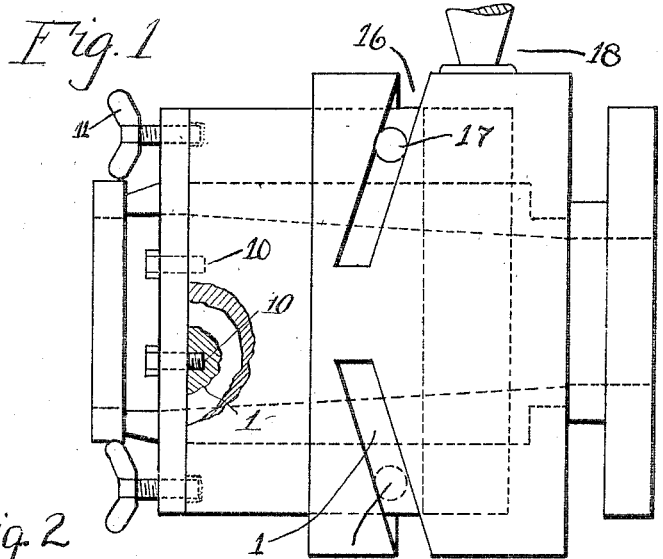
Figure 1 is a side elevation of the invention.

Again referring to the drawings the numeral 1 designates the body of the die provided with radially extending slots 2 in which are slidable cutters 3. These cutters are identical with those now in use with the exception that each cutter is formed with a slot 4 adapted to receive tongues 5 carried by the centering element 6 now to be described.

To accomplish a more substantial connection between the cutters and centering element the latter receives portions of the cutters in the slots 7 formed therein and in which the tongues 5 are arranged. The tongues as well as the wall 8 of each slot 7 are arranged at an incline so that upon longitudinal movement of the centering element the cutters will be moved toward and away from the center of the body; thus it will be seen that in a very substantial manner the cutters can be arranged to accommodate different sized pipes.

In the preferred form of my invention the body is held stationary while the centering element is mounted for sliding movement so that the cutters may be given the proper movement and for the purpose of giving accurate adjustments to the centering element I provide an adjusting head 9.

Figure 2:
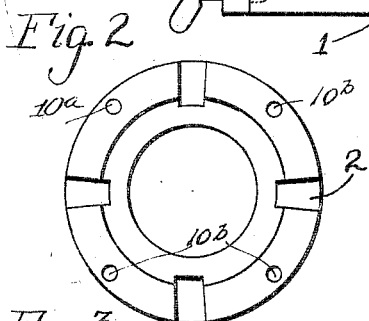
Fig. 2 is an end elevation of the body.
Figure 4:
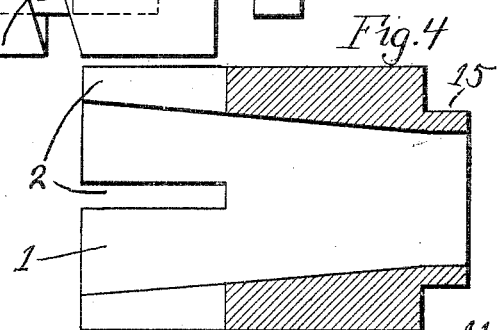
Fig. 4 is a sectional view through the body.
Figure 3:
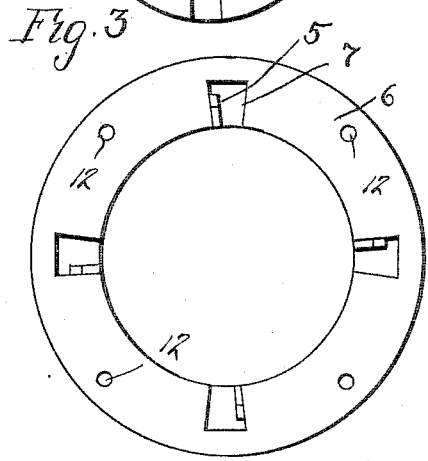
Fig. 3 is an end elevation of the centering element.
Figure 5:
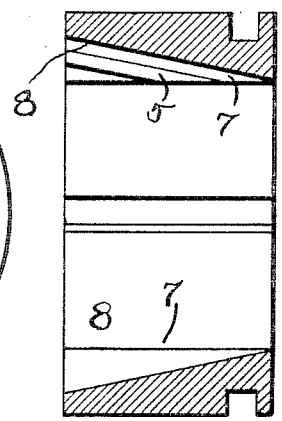
Fig. 5 is a sectional view through the centering element.
Figure 6:
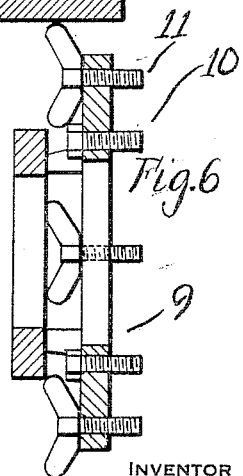
Fig. 6 is a sectional view of the adjusting head.

In this particular form of my invention the adjusting head is bolted to the body by the bolts 10 engaging threaded openings $10^B$, as clearly shown in Fig. 2 and further carries thumb bolts 11, the ends of which are seated in recesses 12 in the centering element. From this arrangement it will be seen that by rotating the bolts 11 the centering element can be given accurate slidable movement for feeding the cutters the proper distance and the bolts will positively hold the centering element against lateral movement during the cutting operation.

For the purpose of quickly collapsing the cutters and in such a manner as to not interfere with the position of the head I provide the collar 13 having a flange 14 mounted in an annular groove 15 in the body. Thus it will be seen that the collar is free to rotate but held against longitudinal movement upon the body. This collar is formed with a pair of cam slots 16 in which are mounted pins 17 carried by the centering element.

To complete the invention the centering element has secured thereto a handle 18 whereby the collar may be given partial rotation for giving movements to the centering element through the cam action between the pin and walls of the slots. This movement of the centering element causes the cutters to be instantly collapsed and as a result allows quick removal of a threaded pipe and the insertion of a new pipe.

From the foregoing description taken in connection with the accompanying drawings it should be apparent that I provide a die of a very substantial construction in which the parts are so arranged and constructed that accurate adjustments will be accomplished and the die instantly collapsed; and further in which the parts are so constructed and assembled that the same may be made solid, thus materially reducing the cost of the die.

What I claim is:—

1. A pipe die comprising a hollow cylindrical body having radial slots, cutters mounted for movements in the slots, a centering element having a tongue and groove connection with the cutters for moving the same toward and away from the center of the body and means connected to the body and acting against the centering element for limiting the movements of the latter, and a collar having a pin and slot connection with the centering element for collapsing the cutters independent of said means.

2. A pipe die comprising a hollow cylindrical body having radial slots, cutters mounted for adjustable movements in the slots, a centering element having a tongue and groove connection with the cutters for adjusting the same, a head having a rigid connection with the body and an adjustable connection with the center and a collar constructed and associated with the centering element to give movements thereto.

3. A pipe die comprising a hollow cylindrical body having radial slots, cutters mounted for movements in the slots, a centering element having a tongue and groove connection with each cutter for giving movements thereto, a head secured to the body adjusting bolts passing through the head for regulating the movements of the head and a manually operated collar having a pin and slot connection with the centering element for moving the same until engaged by said bolts.

In testimony whereof I affix my signature.

WILLIAM A. MILLER.

Copies of this patent may be obtained for five cents each, by addressing the "Commissioner of Patents Washington, D. C."